United States Patent
Hoang

(10) Patent No.: US 9,810,971 B2
(45) Date of Patent: Nov. 7, 2017

(54) CONFIGURABLE COMPACT MOTORIZED DOLLY

(71) Applicant: Chi Hoang, Newbury Park, CA (US)

(72) Inventor: Chi Hoang, Newbury Park, CA (US)

(73) Assignee: Chi Hoang, Newbury Park, CA (US)

( * ) Notice: Subject to any disclaimer, the term of this patent is extended or adjusted under 35 U.S.C. 154(b) by 0 days.

(21) Appl. No.: 15/056,423

(22) Filed: Feb. 29, 2016

(65) Prior Publication Data
US 2016/0259229 A1 Sep. 8, 2016

Related U.S. Application Data

(60) Provisional application No. 62/126,839, filed on Mar. 2, 2015, provisional application No. 62/246,543, filed on Oct. 26, 2015.

(51) Int. Cl.
*G03B 17/56* (2006.01)
*F16M 11/42* (2006.01)

(52) U.S. Cl.
CPC ......... *G03B 17/561* (2013.01); *F16M 11/425* (2013.01)

(58) Field of Classification Search
CPC .......................... G03B 17/561; F16M 11/425
See application file for complete search history.

(56) References Cited

U.S. PATENT DOCUMENTS

| 4,849,778 A | 7/1989 | Samuelson |
|---|---|---|
| 7,611,293 B2 | 11/2009 | Lee et al. |
| 2009/0309986 A1* | 12/2009 | Mayer .................... H04N 5/232 348/208.99 |
| 2010/0059954 A1 | 3/2010 | Fisher |
| 2013/0229569 A1 | 9/2013 | Bevirt et al. |

OTHER PUBLICATIONS

World Intellectual Property Organization, International Search Report and Written Opinion for International Application No. PCT/US2016/020163, dated May 3, 2016, pp. 1-15.

* cited by examiner

*Primary Examiner* — Rochelle-Ann J Blackman
(74) *Attorney, Agent, or Firm* — Jonathan Pearce; SoCal IP Law Group LLP

(57) ABSTRACT

There is disclosed a compact motorized dolly including an elongated casing incorporating a power source and at least one drive motor, a first circular wheel rotably affixed to the distal end of the elongated casing and the at least one drive motor such that actuation of the at least one drive motor causes the first circular wheel to turn, and a device mount secured to the compact motorized dolly such that a device mounted to the device mount moves along with the compact motorized dolly when the drive motor is activated.

15 Claims, 9 Drawing Sheets

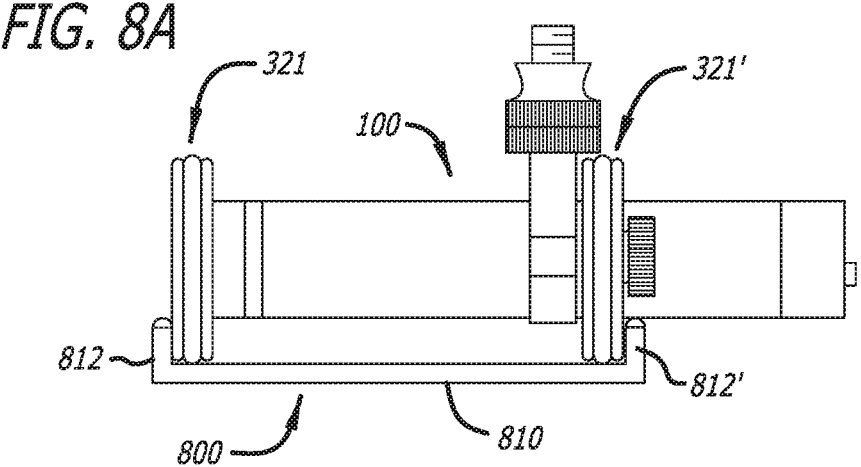
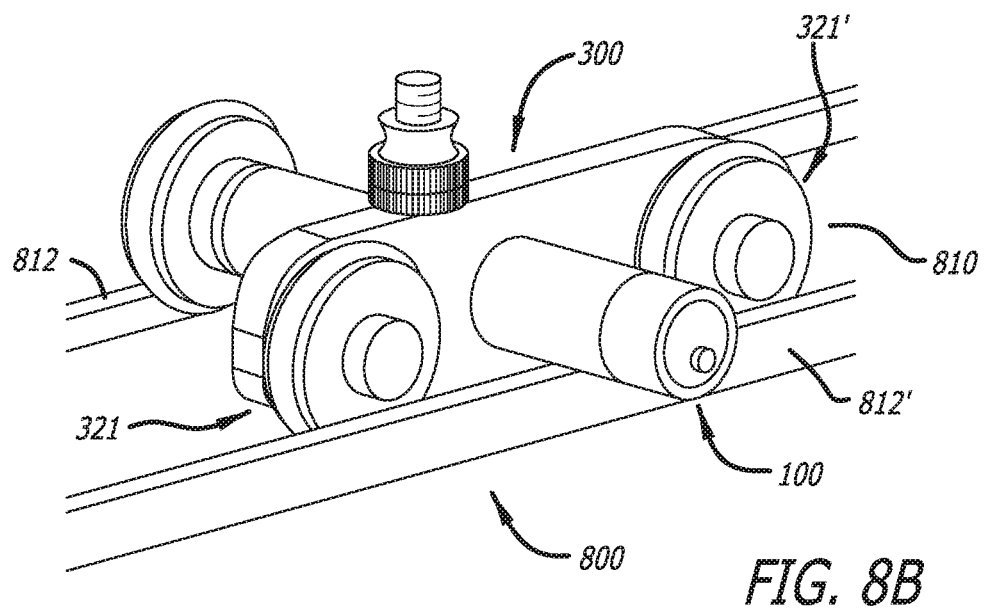

CONFIGURABLE COMPACT MOTORIZED DOLLY

RELATED APPLICATION INFORMATION

This patent claims priority from U.S. provisional patent application No. 62/126,839 entitled "Lightweight, compact, motorized drive apparatus for use as a camera dolly, slider, or swivel base" filed on Mar. 2, 2015 and from U.S. provisional patent application No. 62/246,543 entitled "Accessories and added features for the motor unit in previous provisional application No. 61/216,839" filed on Oct. 26, 2015.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to dollies and, more particularly, to motorized dollies for use in image capture.

Description of the Related Art

Film photography has evolved from early days of motion picture capture from a stationary camera in a single location relative to a set, backdrop, or scene to incorporate first person perspectives, long single-take shots covering minutes of dialogue or action, and aerial photography of an entire scene using cameras held by drones or on wires above a scene.

More recently, the cost of extremely high quality cameras has dramatically reduced. Further, virtually every individual now carries an adequate-quality camera in his or her pocket every day in the form of his or her mobile phone. Cameras capable of high quality film capture have virtually become ubiquitous. There is widespread availability of tripods for use in steady camera shots, but these tripods strongly resemble the single, stationary cameras of the early motion picture days.

In yet another relatively recent change, the Internet has dramatically increased the availability, amount, and relevance of digital video being created by all of those individuals capable of filming virtually anywhere. Advertisers, too, wish to include dynamic film in their advertisements, both on social media and on the web generally.

The vast majority of filming with these cameras and resulting video is created by an individual holding a camera in his or her hands. "Steady-cam" systems, camera rail dollies like those used for years in motion pictures, and various other apparatus for creating more-dynamic digital film capture do exist. However, virtually all of these systems are extremely expensive, bulky to carry from place-to-place, and cumbersome to set up and to use. For example, there are rail systems with large batteries that are so bulky and heavy that they must be carried from place-to-place in a suitcase-size hard case in order to protect their components from the elements. Still other systems rely upon pulleys and guide rails. These systems are also quite heavy, expensive, overly-complex and include many components.

DESCRIPTION OF THE DRAWINGS

FIGS. 8A and 8B illustrate a side view and a perspective view, respectively, of an alternative configuration for a compact motorized dolly on an elongated dolly track.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
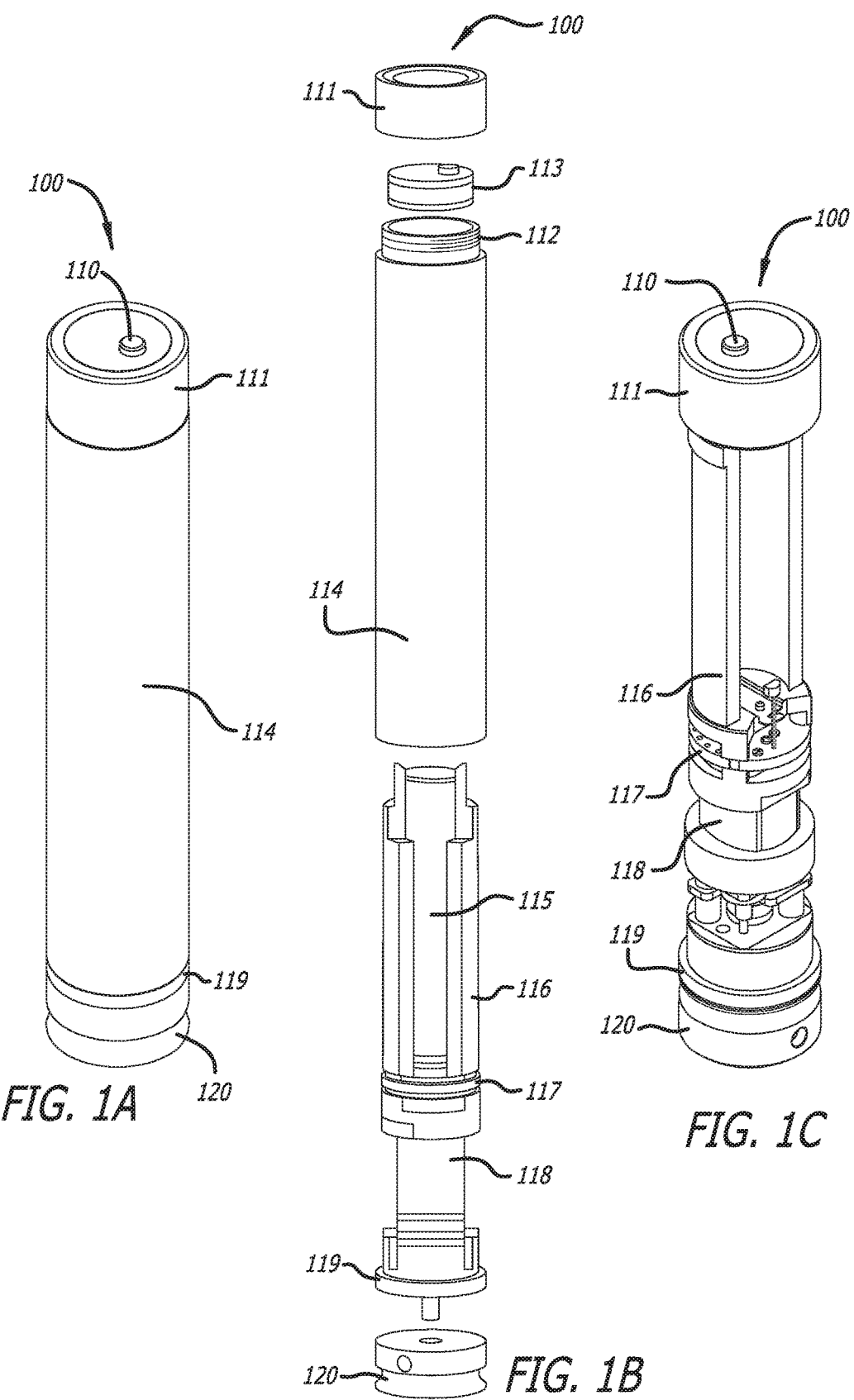
FIGS. 1A, 1B, and 1C are side-view, exploded view and cut-away view, respectively, of an elongated casing of a compact motorized dolly.

Turning first to FIGS. 1A, 1B, and 1C, a side-view, an exploded view and a cut-away view, respectively, of an elongated casing 114 of a compact motorized dolly 100 are shown. FIG. 1 shows a button 110, an end cap 111, a fitting 112, one or more LED lights 113, the elongated casing 114, a battery 115, battery compartment 116, controller circuitry 117, a drive motor 118, a motor bracket 119, and a drive wheel 120. To the extent possible, each of these elements are identified by associated reference numerals in each of FIGS. 1A, 1B, and 1C.

In operation, depression of the button 110 in a preprogrammed sequence causes the controller circuitry 117 to release power from the battery 115 to the drive motor 118 and, thereby, through translation of the motion of the drive motor 118 to the drive wheel 120, the drive wheel 120 is turned. Preferably, this turning is a relatively low rate of speed to enable the compact motorized dolly 100 to move through a wide range of predetermined speeds such that a camera moving at whatever speed is selected will appear to smoothly move across a plane in a moving dolly shot or panning shot. The moving dolly or curve shot may be circular, for example, around a subject or a panning shot that captures a vast area such as landscape. In a panoramic configuration using a panoramic base discussed below with respect to FIGS. 5, 6A, and 6B, the dolly 100 and a camera may be set to create a panoramic photograph in a three hundred and sixty degree circle in an area.

More broadly, the button 110 translates physical force into electric signals to the controller circuitry 117 through the translation of electrical signals along a wire or integrated circuitry from the button 110 to the controller circuitry 117.

The end cap 111 covers the LED lights 113 and the button 110 and retains them in contact with and within the compact motorized dolly 100 by attaching them to the fitting 112. The fitting 112 may be screw threads, snap-on, or other, similar components for attaching one portion of a device to another.

The LED lights 113 may act, as directed by control circuitry 117, as a part of a user interface providing feedback to a user as to the state or mode of operation of the compact motorized dolly 100. For example, the control circuitry 117 may cause the LED lights 113 to blink in pre-determined patterns or to activate specifically-colored LED lights of the LED lights 113 when the compact motorized dolly 100 is in certain operational modes. The LED lights 113 may also provide a battery power notification in a similar manner with specific colors or blink patterns.

The elongated casing 114 is the primary covering for the battery 115 and electrical components of the compact motorized dolly 110. Preferably, the elongated casing 114 is designed such that it slips easily over the remainder of the components and may be permanently affixed (e.g. welding, molding, or adhesively affixed) to the motor bracket 119 or to another portion of the remainder of the compact motorized dolly 100 so that the elongated casing 114 remains in place protecting the other components. Alternatively, the elongated casing 114 may be affixed in such a way that it may be removed, for example, to replace or service the battery 115 or other components of the compact motorized dolly 100.

The elongated casing may include measurement indicia on its exterior. Easy access to measurement indicia can be helpful to users of the compact motorized dolly 100. The indicia may be etched, embossed, or provided by ink.

The battery 115 acts a power source for the drive motor 118 and is retained within the battery compartment 116. The battery 115 may be fixed and rechargeable through, for example, a micro-USB port on the exterior of the compact motorized dolly 110 connected to an external power supply. Alternatively, the battery 115 may be replaceable and of a standard size, such as an "AA" battery or "C" battery. Replacement may be made by removing the end cap 111 and the LED lights 113 (which may make up a unit), by removing the old battery 115 and inserting a new battery 115 in place of the old battery 115.

The control circuitry 117 may be in the form of a printed circuit board or series of printed circuit boards that include all of the desired circuitry, processing, and memory on a single board. The control circuitry 117 connects the button 110, the LED lights 113, the drive motor 118 so that the compact motorized dolly 100 may operate. The control circuitry 117 may be a relatively simple finite state machine that operates when power is directed to the control circuitry 117 in a limited, prescribed manner such as simply providing power from the battery 115 to the drive motor 118. Alternatively, the control circuitry 117 may be relatively complex, housing a programmable processor, memory, operating system software, communications hardware, all responsive to direction from another device or through interaction with a user interface including the button 110, but also potentially including more-complex user interfaces presented on mobile devices or computer screens or screens of devices mounted on the compact motorized dolly 100.

The drive motor 118 is a motor designed to convert electrical current into rotational force under the direction of the control circuitry 117 when power is provided from the battery 115. Preferably, the drive motor 118 is a direct current motor. The drive motor 118 may be a bi-directional stepper motor, a stepped geared motor, a brushless direct current motor, or other, similar motor.

The motor bracket 119 may be used to mount the drive motor 118 to the elongated casing 114. The motor bracket 119 may aid in translation of rotational force from the drive motor 118 or may merely act to hold the drive motor 118 within the elongated casing 114 of the compact motorized dolly 100. The motor bracket 119 may be attached by screws, pins, or similar attachment mechanisms to the drive motor 118 and may further be attached to the elongated casing 114 by being pressed into the elongated casing 114 during manufacture. Alternatively, the motor bracket 119 may be affixed to the elongated casing 114 by adhesive or by threaded counterparts in each of the motor bracket 119 and the elongated casing 114.

The drive wheel 120 turns as motion from the drive motor 118 is translated to the drive wheel 120. The drive wheel 120 may have an indentation or outer circular groove suitable for affixing a tire or other high friction ring to provide grip and stabilization to the drive wheel 120 as it is turned by the drive motor 118. Preferably, the drive wheel 120 includes an o-ring, tire, or similar gripping material along its exterior circumference so that motion translated from the drive motor 118 is translated smoothly into movement of the compact motorized dolly 100. Alternatively, as described below, the groove of the drive wheel 120 may be sized to fit over a rail, in which case a frictional surface within the groove may be provided.

The use of a single drive wheel 120 greatly reduces the complexity and cost of the overall compact motorized dolly 100 system. Further, because the device is small, it may be easily carried from place-to-place within a user's pocket or a small bag. Thus, the compact motorized dolly 100 overcomes all of the limitations of the prior art which include bulk, complexity, and difficulty in transporting those dolly systems to a desired location. The compact motorized dolly 100 may be easily carried to a location as an afterthought rather than through careful packing and lugging large equipment and power sources to a desired filming location.

Further, the shape and compact size enables the primary attachment mechanism for the compact motorized dolly 100 to accessories (such as the wheel assembly 300 or panoramic base 500, discussed below) may be by sliding over and frictionally-engaging with the elongated casing 114 of the compact motorized dolly 100. Larger, more complex dolly systems cannot mount or interface so simply with accessories or additional components. Further, depending on the camera shot desired, different dollys, stands, or control systems altogether may be required to create the types of shots available through the use of a single compact motorized dolly 100 (e.g. panning shots, panoramic shots, shots circling an object, curved panning shots, etc.). The compact size and simple interface of the compact motorized dolly 100 set it apart from complex and bulky prior art systems and enable broader functionality.

The compact motorized dolly 100 may be made of aluminum, steel, injection-molded plastic or other similar materials. In some cases, the material must be a material that does not interfere with magnetic sensors or radio-frequency transceivers so that external triggers and communication may be possible.

Figure 2:
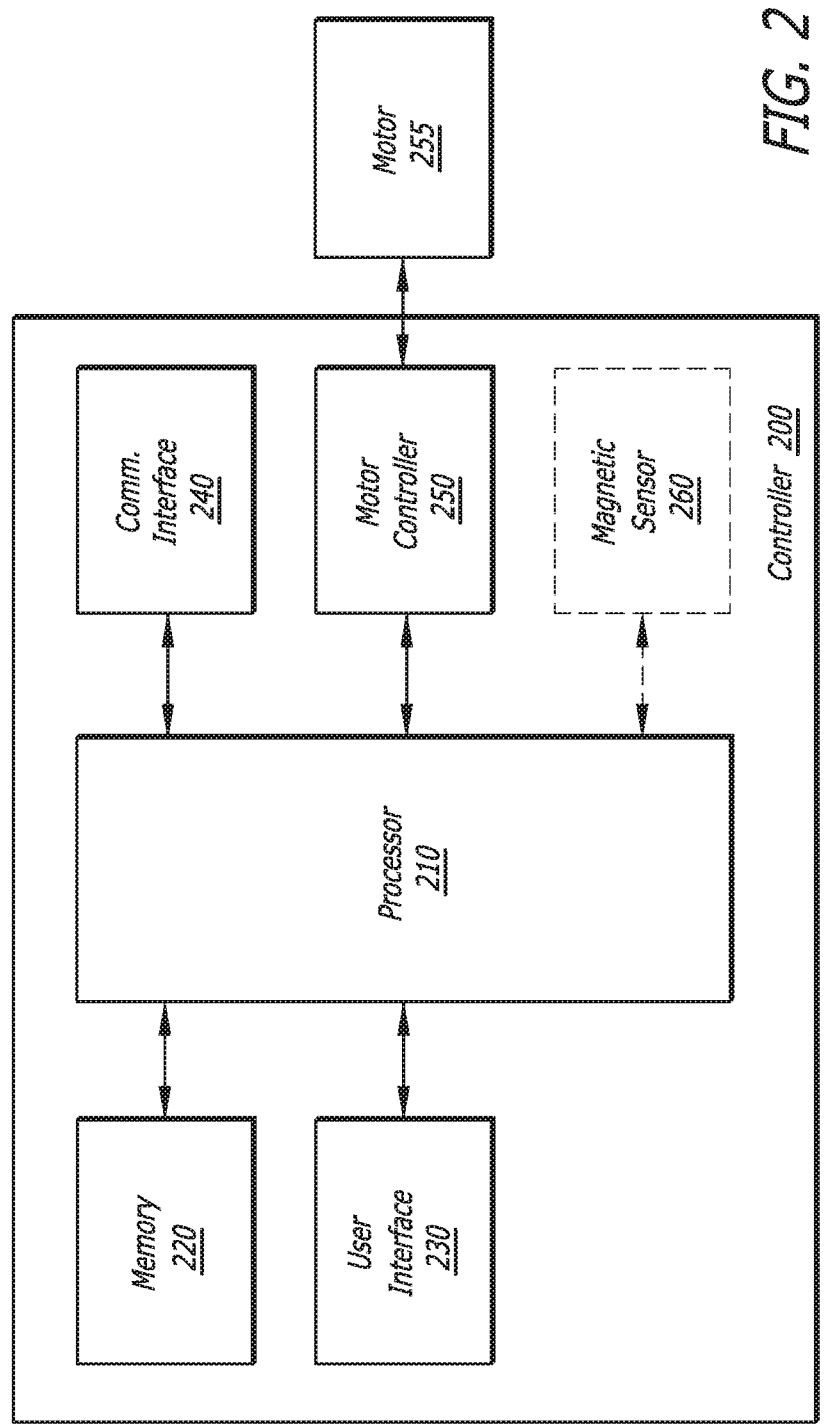
FIG. 2 is a functional block diagram of a controller for a compact motorized dolly.

FIG. 2 shows a functional block diagram of a controller 200 for a compact motorized dolly. The controller circuitry or controller 200 includes a processor 210, memory 220, a user interface 230, a communications interface 240, a motor controller 250 and a motor 255 (e.g. drive motor 118 in FIG. 1). Some of these elements may or may not be present, depending on the implementation. Or, as discussed above, the elements may be implemented as a finite state machine or similar non-programmable controller 200. Further, although these elements are shown independently of one another, each may, in some cases, be integrated into another.

The processor 210 may be or include one or more microprocessors, microcontrollers, digital signal processors, application specific integrated circuits (ASICs), or a system-on-a-chip (SOCs). The memory 120 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system. The operating system may include functions to support the user interface 230 or the communications interface 240, such as protocol stacks, coding/decoding, compression/decompression, and encryption/decryption. The stored software programs may include an application programming interface (API) to enable interaction with a computer or phone-based application or "app" to cause the controller 200 to perform portions of the processes and functions described herein.

The user interface 230 may include LEDs, like LED lights 113 in FIG. 1, and a button, like button 110 of FIG. 1, and may incorporate, using the API, interactions received from a separate personal computing device, such as a smart phone, in communication with the controller 200 using the communications interface 240. Interactions with the user interface 230 may control the operation of the processor 210 and the motor controller 250.

The communications interface 240 may include at least one interface for wireless communication with external devices. The communications interface 240 may include one or more of a cellular telephone network interface, a wireless local area network (LAN) interface, and/or a wireless personal area network (PAN) interface. The cellular telephone network interface may use one or more cellular data protocols. The wireless LAN interface may use the WiFi® wireless communication protocol or another wireless local area network protocol. The wireless PAN interface may use a limited-range wireless communication protocol such as Bluetooth®, Wi-Fi®, ZigBee®, or some other public or proprietary wireless personal area network protocol. A wireless PAN, for example may be used to communicate with nearby personal computing devices to enable user interaction through an API.

The communications interface 240 may include radio-frequency circuits, analog circuits, digital circuits, one or more antennas, and other hardware, firmware, and software necessary for communicating with external devices. The communications interface 240 may rely on the processor 210 to perform some or all of these function in whole or in part.

The motor controller 250 operates in conjunction with the user interface 230 under the direction of the processor 210 and any associated programming (or permanent operating instructions) to control operation of the motor 255 (e.g. drive motor 118 of FIG. 1). The motor controller 250 may provide continuous current at a fixed level to the motor 255 or may pulse power to the motor 255 periodically or may activate in response to external stimuli (e.g. magneto resistance detected by a magnetic sensor). Programming may include multiple modes of operation for the motor controller 250 and the button 110 of FIG. 1 may be depressed one or more times in a predetermined interval of time in order to activate different modes for the motor controller 250. Alternatively, the user interface 230 or that of an external device accessing the processor 210 by means of an API may control operation of the motor controller 250 or selection of a mode for the motor controller 250. The processor 210 may also instruct the LED lights, element 113 in FIG. 1B, to operate in a particular blinking pattern or a particular color dependent upon the operational mode selected for the motor controller 250.

The motor 255 operates as instructed by the motor controller 250 when power is provided.

A magnetic sensor 260 may be used in one or more embodiments. The magnetic sensor 260 is a sensor designed to provide an electrical signal to the processor when a magnetic field is detected within a certain, known proximity. The magnetic sensor 260 may, for example, inform the processor 210 that a magnetic field provided by a magnetic probe (e.g. a wand or extendible wand including a magnet on its end) or a magnetic end stop is near the compact motorized dolly 100. This magnetic sensor 260 may then instruct the processor to stop at the end stop so that motorized dolly 100 does not advance past a designated position and/or reverse direction until the next magnetic end stop is reached and repeat the cycle so that the motorized dolly 100 traverse between two end stops continuously and autonomously. In another application, the magnetic sensor 260 may instruct the processor to "advance" the compact motorized dolly 100 to the next movement location. Using this type of magnetic sensor 260 can enable step-wise photography across a time-frame, for example, motion capture photography. A suitably programmed processor 210 may move to the next of a pre-determined location along a predetermined path in either direction with each detection of a magnetic field, thereby creating images across a known path as the compact motorized dolly 100 advances.

Figure 3:
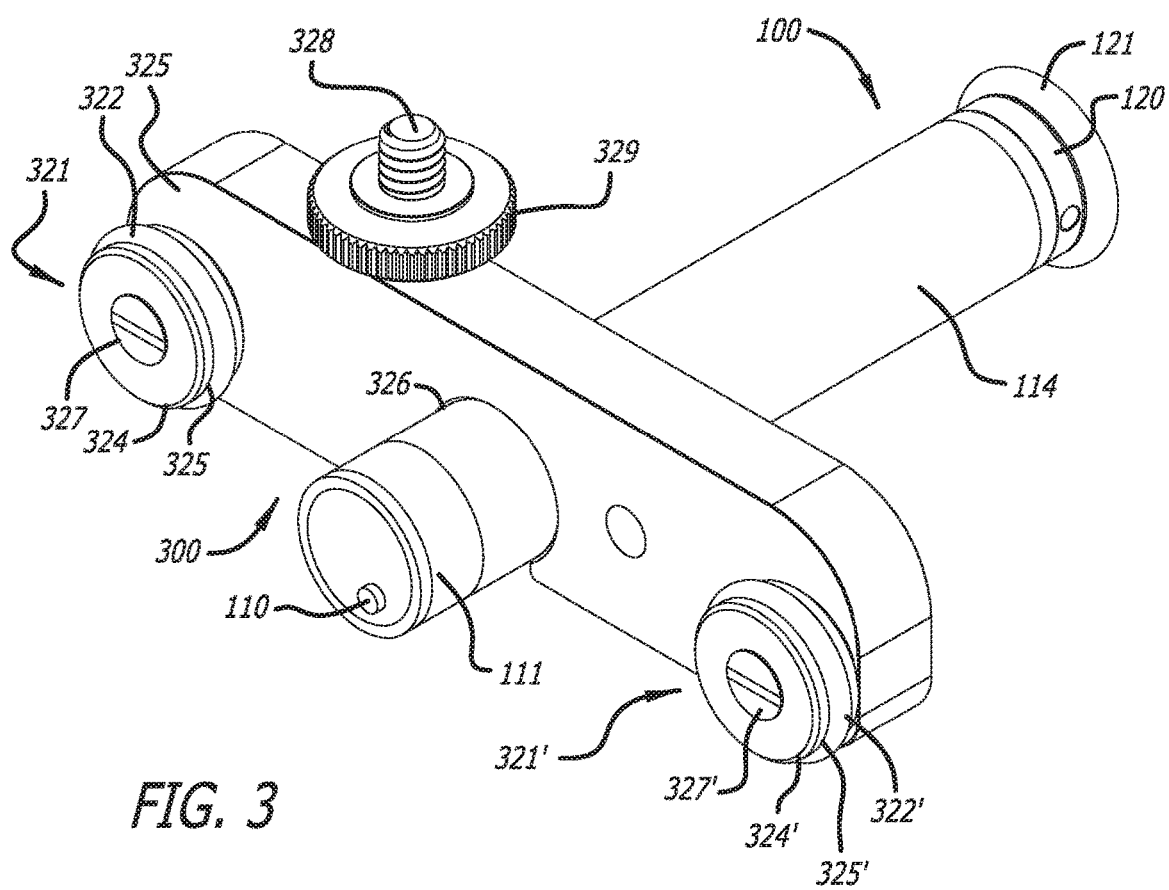
FIG. 3 is a view of an elongated casing of a compact motorized dolly engaged with a wheel assembly.

FIG. 3 is a view of an elongated casing 114 of a compact motorized dolly 100 engaged with a wheel assembly 300. The wheel assembly 300 includes two wheels 321, 321', each made up of an o-ring 322, 322', a wheel hub 325, 325', ball bearings 324, 324', and screws 327, 327', a bracket 325, and a hole 326 for receiving the cylindrical dolly casing 114. The wheel assembly 300 further includes a threaded camera mount 328 and a knurled tightening base 329. The button 110 and the end cap 111 may be seen. Also, an o-ring 121 may be seen on the drive wheel 120 which may be driven by the drive motor (not shown).

The wheel assembly 300 is made up of a bracket 325 and a hole 326 along with mounting holes (not shown) for each of the wheels 321, 321'. The bracket 325 is temporarily affixed to the elongated casing 114 by passing the elongated casing 114 through the hole 326 in the bracket 325. The hole 326 may be precisely machined so as to fit snugly around the exterior of the elongated casing 114 such that as the drive wheel 120 turns, the elongated casing 114 does not turn with the drive wheel. However, the drive motor (not shown) is sufficiently powerful to drive the drive wheel 120 along with both of the wheels 321, 321', which are essentially slaves of the drive wheel 120. Thus, as the drive wheel 120 turns, the combined compact motorized dolly 100 with the wheel assembly 300 may be moved by the drive motor (not shown)

in a direction of the motorization by the drive motor. The straight wheel assembly 300 shown in FIG. 3 is driven by the drive motor 255 in a straight path perpendicular to the elongated shaft 114. To this end, the wheels 321, 321' desirably have the same diameter as the drive wheel 120 to ensure a linear path.

The hole 326 may be coated along its interior with an anti-slip or adhesive coating to ensure that the elongated casing 114 is unable to turn freely within the hole 326. Alternatively, the elongated casing 114 (or a portion thereof) may be coated with anti-slip material or an adhesive coating to ensure that the elongated casing 114 does not move, once inserted. Alternatively, there may be a keyed arrangement between the exterior of the casing 114 and bracket 325, or hole 326 therein, for more positive rotational fixation. However, the elongated casing 114 is designed to be installed, removed, and re-installed within the hole 326 many thousands of times. In this way, the overall compact motorized dolly 100 may be freely broken down into its constituent parts for transport and reassembled easily when needed.

The wheels 321, 321' are designed to move freely upon application of force by the drive motor (not shown) through the use of wheel hubs 325, 325' mounted on ball bearings 324, 324' and loosely attached with screws 327, 327'. The o-rings 322, 322' provide a gripping material sufficient to ensure smooth rotation of the wheels 321, 321' and thus smooth movement of the compact, motorized dolly 100.

The camera mount 328 and knurled tightening base 329 are used to mount a camera to the compact motorized dolly 100. Though shown as a standard-sized camera mount 328, the camera mount 328 may in fact be any number of mount-types dependent upon the object desired to be mounted on the compact motorized dolly 100. For example, a ball head or a camera clamp may be mounted using the same camera mount 328 or similar or different mounting hardware suitable for use with the desired device to be mounted.

Similarly, a planar mount (e.g. FIG. 9), for example a plane mounted to the camera mount 328 by means of corresponding threads, may be mounted that includes one or more mount-points, threaded holes, brackets, or holders for devices of various types. The planar mount may include mount points for mobile phone holders, specialized holders for unusual equipment such as three-dimensional imaging equipment, multi-camera photographic rigs, panoramic cameras, audio equipment or similar devices. Such a planar mount may extend over a portion of the compact motorized dolly 100 and may be held in place by its attachment to the camera mount 328. The material may be injection molded plastic, aluminum or steel, depending on the weight to be held by the planar mount.

Figure 4A:
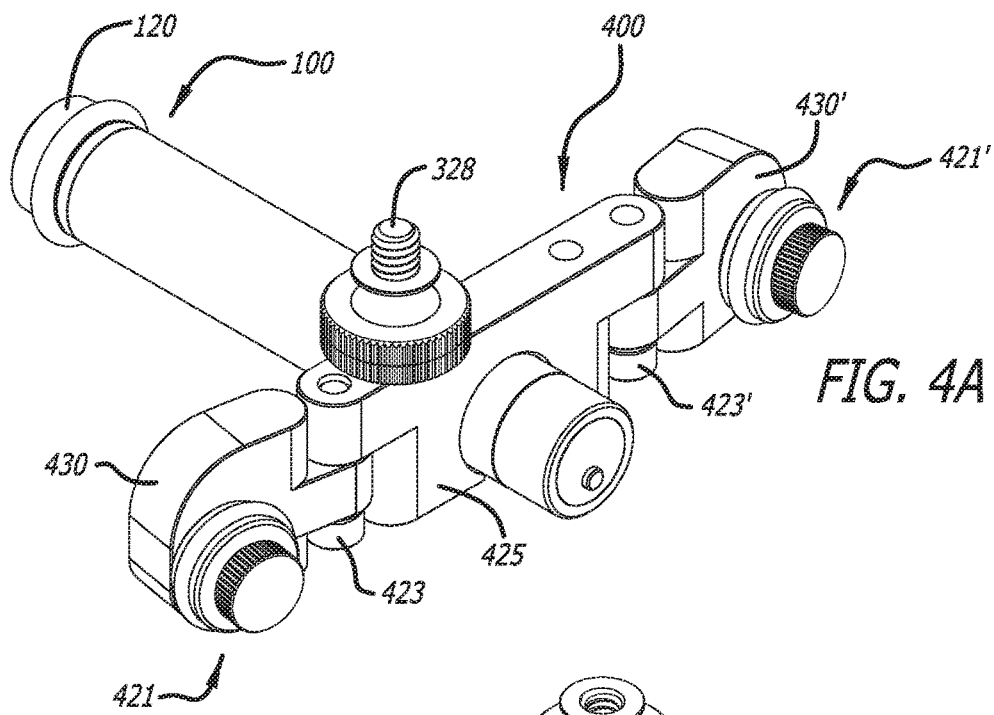
FIGS. 4A, 4B, and 4C are views of an elongated casing engaged with a wheel assembly including two hinged flanges and two wheels (4A), a partially exploded view of a wheel assembly including two hinged flanges and wheels (4B), and an exploded view of a wheel (4C).
Figure 4B:
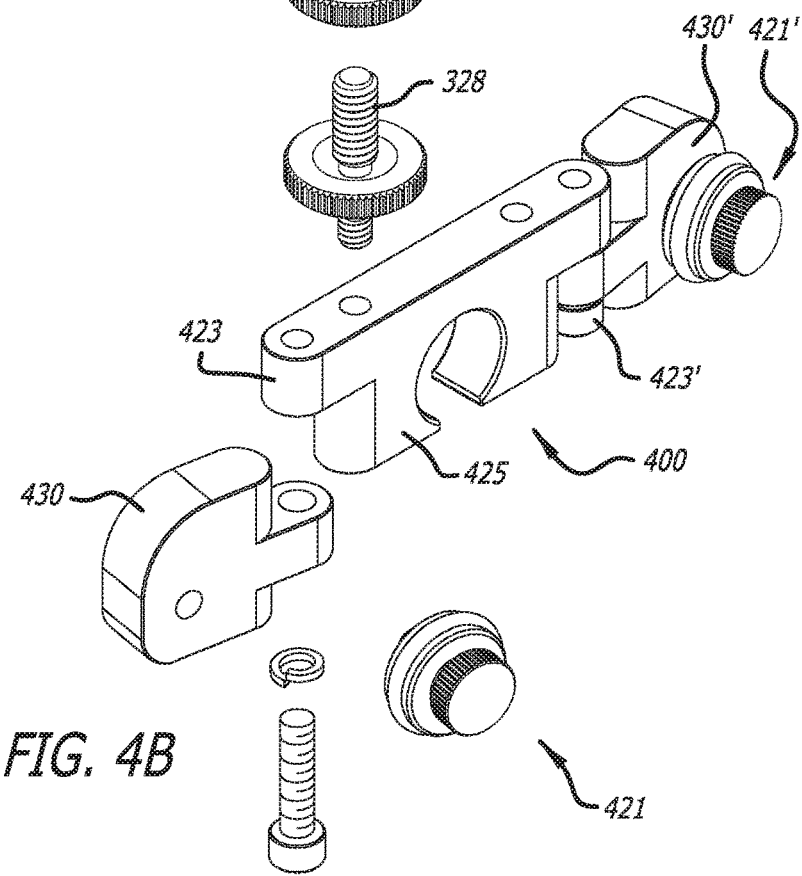
Figure 4C:
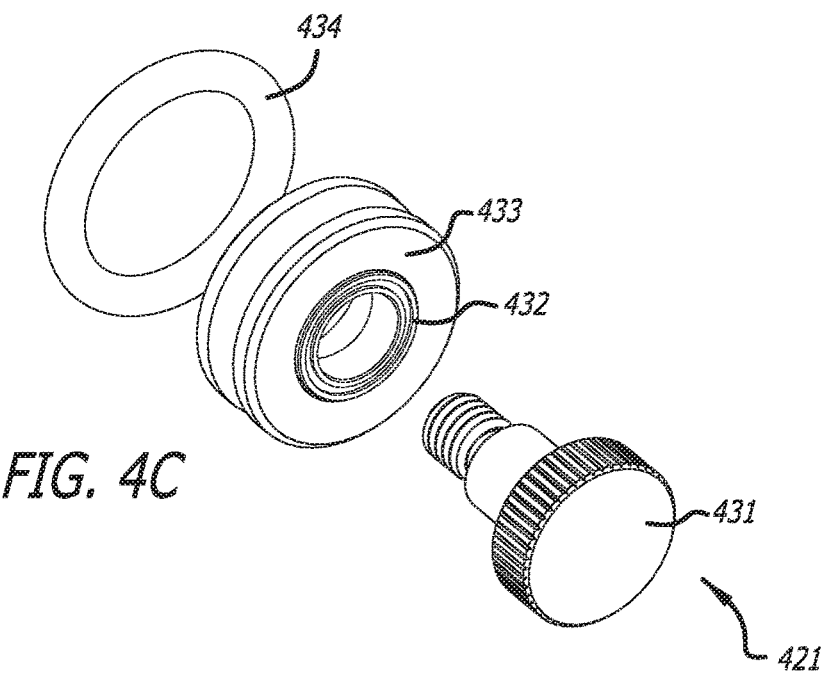

FIGS. 4A, 4B, and 4C are views of an elongated casing 100 engaged with a wheel assembly 400 including two hinged flanges 430, 430' and two wheels 421, 421', a partially exploded view of a wheel assembly 400 including two hinged flanges 430, 430', and wheels 421, 421', and an exploded view of a wheel 421, 421', respectively.

This wheel assembly 400 differs from that of FIG. 3 in that this wheel assembly 400 includes a central bracket 425 with the two flanges 430, 430' mounted to either end of the wheel assembly 400 on two hinges 423, 423'. Otherwise, the wheel assembly 400 is substantially similar to that in FIG. 3 and the elements similar to those in FIG. 3 will not be repeated here.

The two flanges 430, 430' and associated wheels 421, 421' being mounted on the two hinges 423, 423' enable the wheel assembly 400 to be configured to enable the overall compact motorized dolly 100 to move along a curved path. The straight wheel assembly 300 shown in FIG. 3 is only capable of being driven by the drive motor in a straight path perpendicular to the elongated shaft 114 (FIG. 1A).

Here, because of the two hinges 423, 423', the angles of the wheels 421, 421' may be altered, relative to the drive motor and the elongated casing 114 and the compact motorized dolly 100 can be made to move along a curved path. For example, if the wheels 421, 421' are curved inward, toward the elongated shaft 114, driving motion of the drive motor will cause the compact motorized dolly 100 to move about a curve such that the bracket 425 moves farther than the drive wheel 120 for every rotation of the drive wheel 120. In other words, the bracket 425 and drive wheel 120 rotate around a central axis located outside of the drive wheel. This causes the bracket 425 (and any device mounted on the associated mount 328) to pan across an arc. Conversely, pushing the wheels 421, 421' to be further outward relative to the elongated casing 114 causes the overall compact motorized dolly 100 to curve around an object with the drive wheel 120 travelling further than the wheels 421, 421' with every rotation of the drive wheel. The drive wheel 120 and bracket 425 rotate around an axis located outside of the bracket.

Because curved motion of the compact motorized dolly 100 is available through use of the flanges 430, 430', the compact motorized dolly 100 may be made to circle around an object placed within the vision of a camera to thereby create a full three-hundred and sixty degree image of a single object at the center of the resulting circle. Similarly, three-dimensional cameras, such as stereographic cameras, that create three-dimensional representations of objects or three-dimensional scanners that likewise create three-dimensional models of real-life objects by observing those objects may be made to circle an object uniformly using the compact motorized dolly 100 to thereby create a desired three-dimensional model of the object.

The wheels 421, 421' are free-moving or slave wheels meaning that they are not driven by anything such as the drive motor 118 (FIG. 1). As such, they include a shoulder screw 431, one or more ball bearings 432, a wheel hub 433 and may include an o-ring 434. The shoulder screw 431 slides through the ball bearings 432 (which are inserted into the wheel hub 433, and then may be inserted into corresponding threaded hole of a respective wheel flange 430, 430'. Wheels 421, 421' may be of various sizes, with corresponding o-rings 434 of various sizes as well, though both wheels 421, 421' desirably are equal in diameter. The larger the wheel, the further and faster the compact automated dolly 100 will move through actuation of the drive motor 118. Different sized wheels 421, 421' may be used to tilt the camera platform, but the same effect could be achieved with a tilted bracket.

Figure 5:
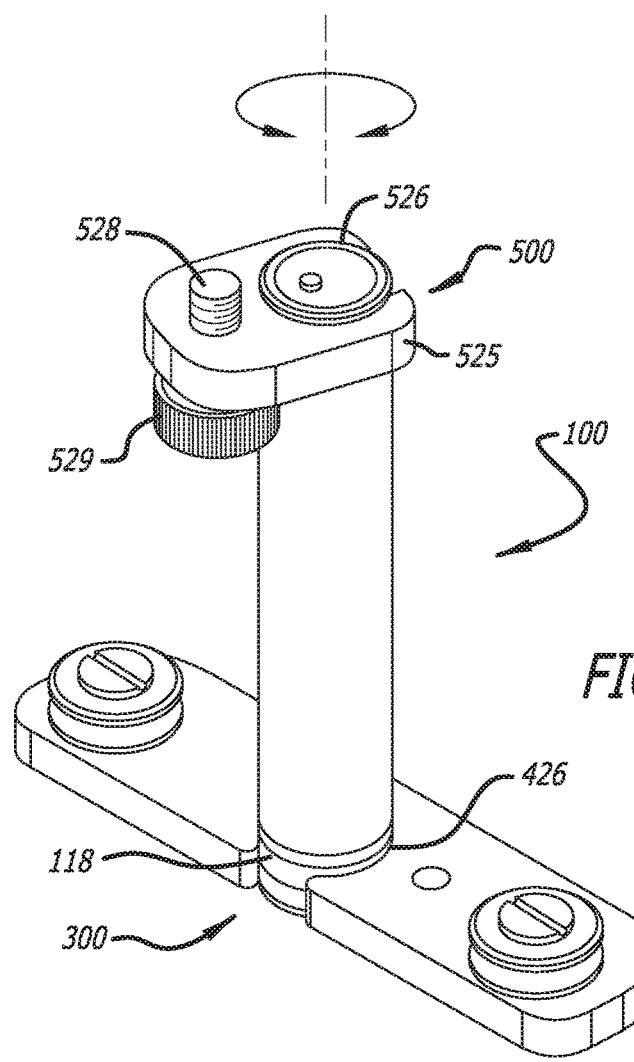
FIG. 5 is a panoramic base affixed to one end of an elongated casing of a compact motorized dolly.

FIG. 5 is a panoramic base 500 affixed to one end of an elongated casing 114 of a compact motorized dolly 100. The panoramic base 500 includes a bracket 525, a hole 526, and a camera mount 528 and knurled tightening base 529. As above with the wheel assembly 300, the hole 526 may be precisely machined so that a first end, away from the wheel 118, of the elongated casing fits snugly within the hole 526. As above, gripping or adhesive materials may line the interior of the hole 526 or the exterior of the elongated casing, or the cooperating components may be positively keyed together.

The hole 426 in the wheel assembly 300 may fit snugly over the wheel 118 such that as the wheel 118 is driven, the elongated casing of the compact motorized dolly 100 turns, as does the bracket 525 and the associated camera mount 528 and knurled tightening base 529.

In operation, actuation of the drive motor causes the bracket 525 and associated camera mount 528 to rotate around enabling an affixed camera to take a "panoramic" shot of the surroundings. Full three hundred and sixty degree rotations (or more) are possible using this panoramic base 500.

Figure 6A:
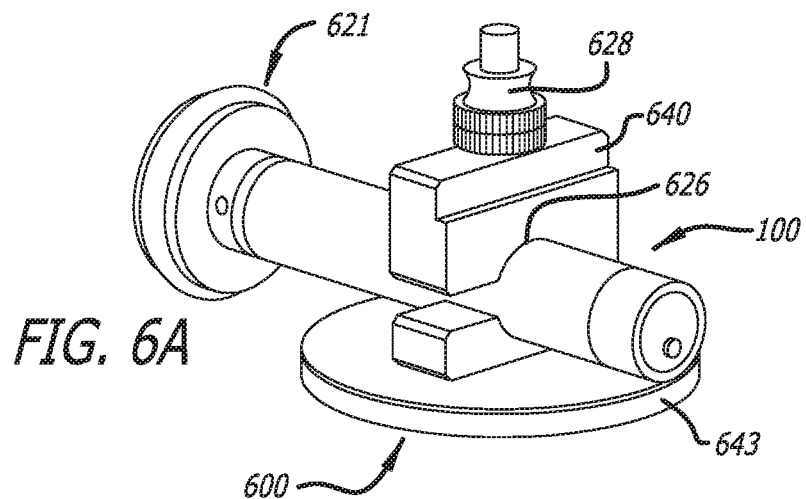
FIGS. 6A and 6B show an alternative panoramic base including a bracket through which an elongated casing of a compact motorized dolly may pass and an exploded view of the same, respectively.
Figure 6B:
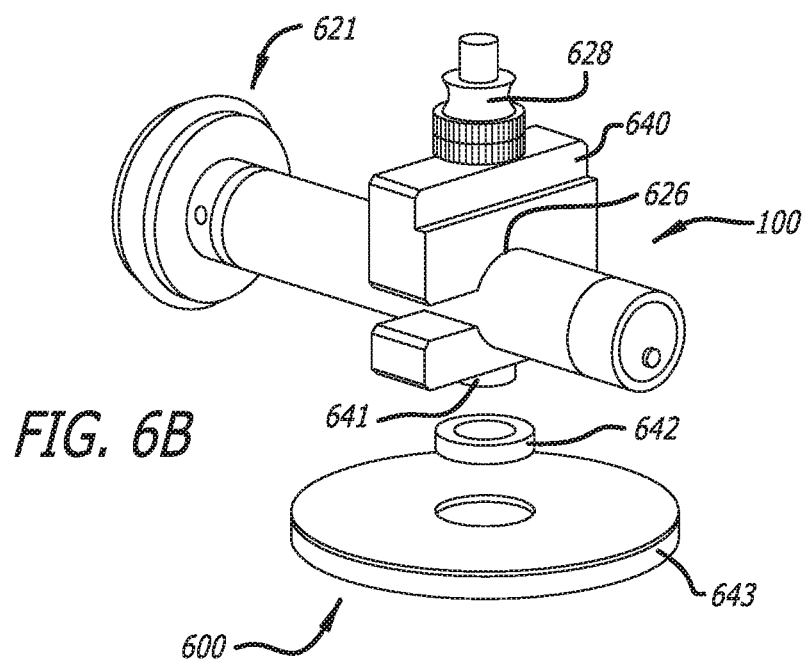

FIGS. 6A and 6B show an alternative panoramic base 600 including a bracket 640 through which an elongated casing of a compact motorized dolly 100 may pass, and an exploded view of the same. Many of the components in FIGS. 6A and 6B are described in previous figures. Those descriptions will not be repeated here.

The panoramic base 600 includes a base 643, which may be a base plate (as shown), a bracket 640 including a mount point 641, one or more ball bearings 642, a hole 626, and a camera mount 628. The base 643 is designed so as to provide a stable base placed upon the ground or other fixed support upon which the bracket 640 may rotate about a vertical or other axis when driven. The mount point 641 provides a mount for the bracket 640 to mount upon and to be held by the base 643. The ball bearing 642 (which may be one or more ball bearings) lowers the overall friction as the bracket 640 is turned.

The bracket 640 itself has a hole 626 through which the compact motorized dolly may pass. Preferably, frictional force is provided by the hole 626 sufficient to hold the compact motorized dolly 100 in place without any need of external tools, but sufficient that an individual's hand may be used to insert and remove the compact motorized dolly 100.

Finally, a camera mount 628, which as discussed above may be a mount for a device other than a camera including a planar mount.

As above, a camera mounted to the mount point 641 of the bracket 640 will move in a full three hundred and sixty degrees (or more or less) when the drive motor 118 (within motorized dolly 100 as seen in FIG. 1B) is activated to thereby drive the compact motorized dolly 100 around the panoramic base 600. This enables the camera to take panoramic photographs of the surroundings.

Figure 7:
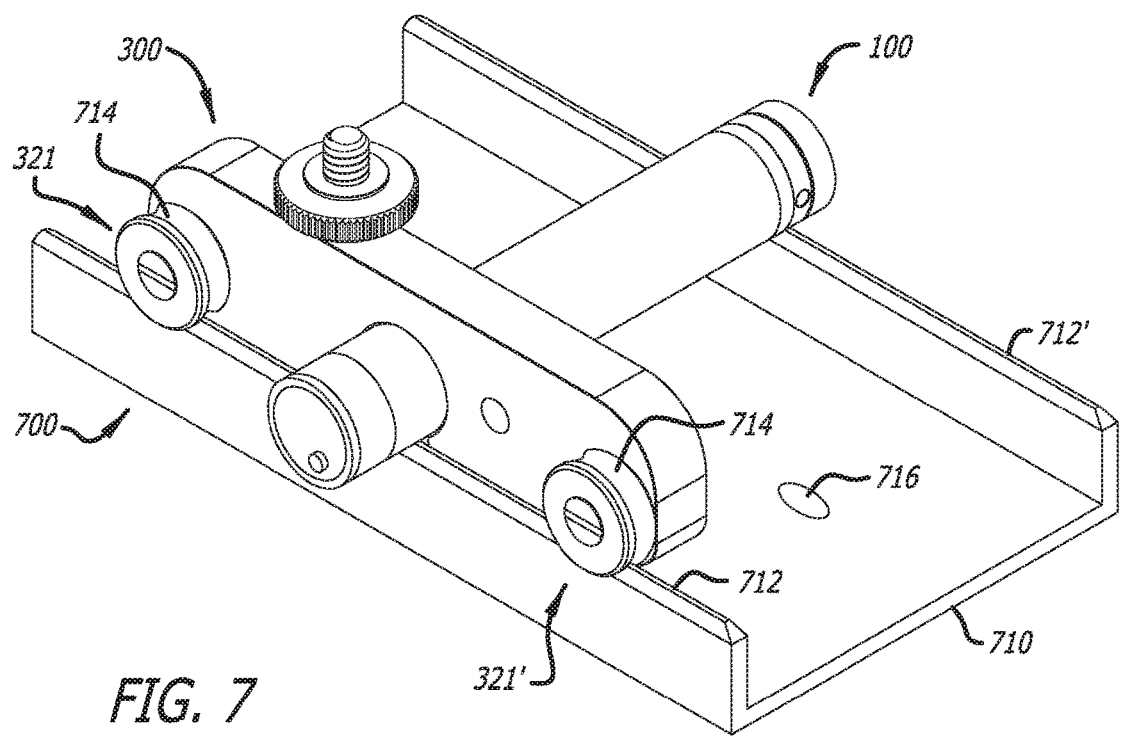
FIG. 7 is the compact motorized dolly mounted on an elongated dolly track.

FIG. 7 is the compact motorized dolly 100 mounted on an elongated dolly track 700. The compact motorized dolly 100 is removably affixed to the wheel assembly 300. Though a straight wheel assembly, like that shown in FIG. 3, is shown, the wheel assembly 400 of FIG. 4A is equally useable with the elongated dolly track 700 if the hinged flanges 430, 430' are aligned with the central bracket 425. Alternatively, a curved track may be provided over which the wheel assembly 400 of FIG. 4A may traverse if configured to travel in an arc.

The elongated dolly track 700 has a base 710 and two engagement rails 712, 712', and a mounting hole 716. Further, the wheels 321, 321' include engagement grooves 714, 714' in place of o-rings (not shown), much like train wheels on tracks.

The engagement rails 712, 712' may be tapered near the top (as shown) to aid in placing the engagement grooves 714, 714' on the elongated dolly track 700. As such, the compact motorized dolly 100 and wheel assembly 300 combination can move, when the drive motor 118 is activated, along the elongated dolly track. The engagement rails 712, 712', and engagement grooves 714, 714' ensure that the combination moves along a straight path that is incredibly smooth. The engagement rails 712, 712' and engagement grooves 714, 714' may be precisely machined so as to ensure smooth operation.

Alternatively, the engagement rails 712, 712' and engagement grooves 714, 714' may be machined with corresponding groove and rail shapes such that the wheels 321, 321' fit over the engagement rails 714, 714' and interlock and the wheels 321, 321' only move along the track. In this way, the compact motorized dolly 100 and wheel assembly 300 combination may be moved along the elongated dolly track 700 while the track 700 is in virtually any position, including upside-down.

The base 710 may include one or more mounting holes, like mounting hole 716. The hole 716 may be machined such that it mounts on, for example, a typical camera mount. As such, the elongated dolly track 700 may be mounted atop a tripod or other typical camera mounts.

The resulting compact motorized dolly 100, wheel assembly 300, and elongated dolly track 700 enable slow panning shots to be taken using a mounted camera. As the drive motor 118 is activated, the compact motorized dolly 100 moves down the track. The slow panning shots may be beside an object, toward an object or away from an object.

FIGS. 8A and 8B illustrate a side view and a perspective view, respectively, of an alternative configuration for a compact motorized dolly 100 on an elongated dolly track 800. This embodiment is quite similar to that shown above with respect to FIG. 7. Accordingly, the elements that are the same will not be described again here.

This elongated dolly track 800 includes a base 810 and two engagement rails 812, 812'. However, in this embodiment, the wheels 321, 321' fit inside the two engagement rails 812, 812' rather than on top of them. The result is similar in that a camera mounted on top of the combined compact motorized dolly 100 and wheel assembly 300 will move along the elongated dolly track 800 when the drive motor 118 (not shown) is activated. The wheels 321, 321' include o-rings to ensure grip on the elongated dolly track 800. As before, the track is known and thus slider shots may be created for a mounted camera.

Figure 9:
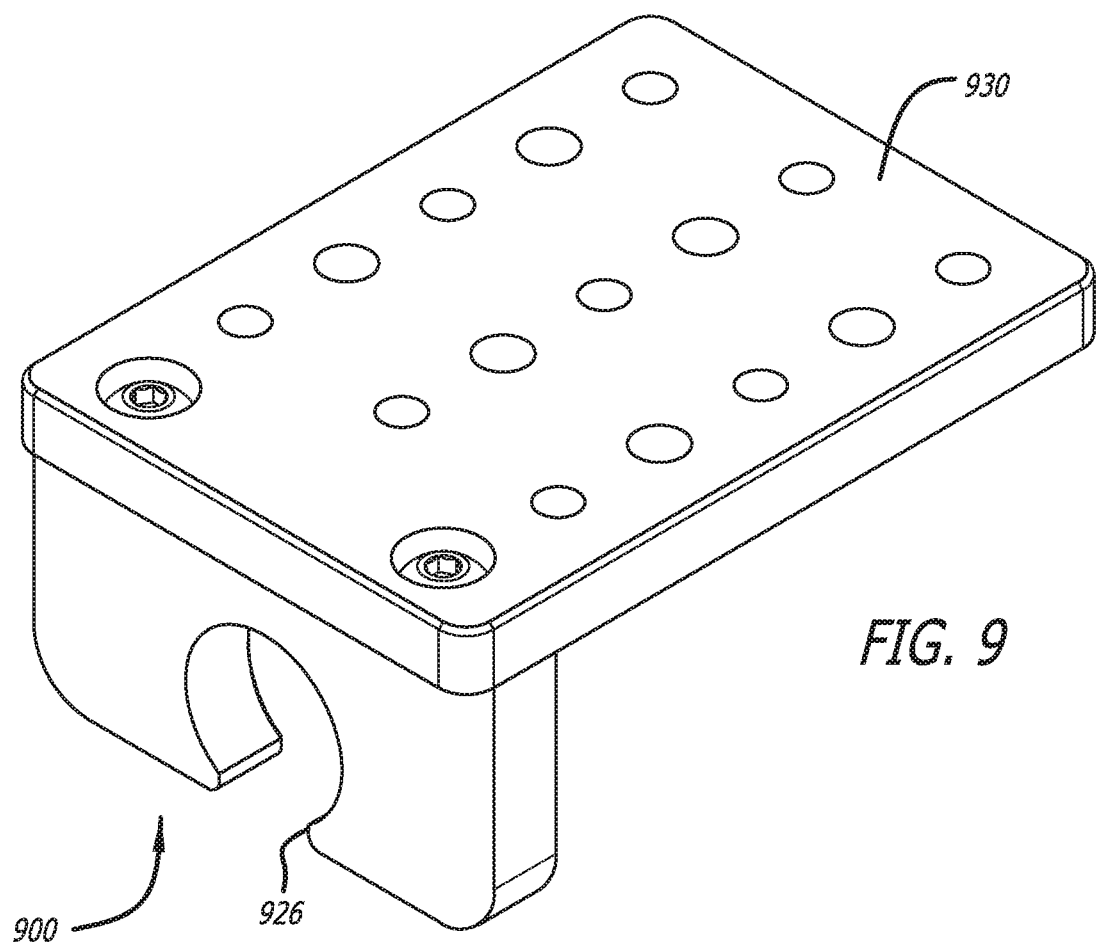
FIG. 9 is a planar mount that may be used with the compact motorized dolly.

FIG. 9 is a planar mount 900 that may be used with the compact motorized dolly. The planar mount 900 (for example a cheese plate) may be mounted on top of a camera mount, such as camera mount 328 in FIG. 3, or a similar mount and be fixed above a compact motorized dolly 100. Alternatively, as shown in FIG. 9, the planar mount 900 may include a hole 926, which like the hole 326 in the bracket 325 (FIG. 3), may slip over the compact motorized dolly 100 and engage frictionally with the compact motorized dolly 100 to thereby remain in place over the compact motorized dolly 100. If the hole 926 is used, the bracket 325 may, still, also be used because both may simultaneously engage with the exterior of the elongated casing 114 (FIG. 1) of the compact motorized dolly.

The planar portion 930 of the planar mount 900 may include one or more threaded holes (not labeled) which further camera mounts or other mounting structures may be affixed. One or more of these holes may not be threaded and may merely be holes through which bolts or screws or other attachment devices may pass to thereby removably attach devices such as cameras to the planar mount 900.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A compact motorized dolly comprising:
an elongated casing defining a longitudinal axis and incorporating a power source and a drive motor, the elongated casing having a proximal end and a distal end spaced apart along the axis;
a single circular drive wheel rotatably affixed to the distal end of the elongated casing and coupled to the drive motor such that actuation of the drive motor causes the drive wheel to turn about the axis;
a device mount secured to the compact motorized dolly such that a device mounted to the device mount moves along with the compact motorized dolly when the drive motor is activated;
a wheel assembly detachably affixed perpendicular to and at a proximal end of the elongated casing, the wheel assembly comprising a set of wheels comprising a second and a third circular wheel fixed at opposite ends of the wheel assembly, each of the set of wheels rotable about an axis such that when the drive motor turns the first circular wheel, the set of wheels is driven, wherein the device mount is affixed to the wheel assembly; and
a first and a second flange, each affixed at opposing ends of the wheel assembly and incorporating one of the second and the third wheel, wherein the first and the second flange are mounted to the wheel assembly using a first hinge and a second hinge such that an angle of the second wheel and the third wheel relative to the first wheel may be altered through movement of the respective first or second hinge so that operation of the drive motor causes the compact motorized dolly to move along a curved path.

2. The compact motorized dolly of claim 1 wherein the wheel assembly detachably affixes to the elongated casing by insertion of the elongated casing through a hole in the wheel assembly such that the elongated casing is frictionally engaged by the wheel assembly.

3. The compact motorized dolly of claim 2 wherein an interior circumference of the hole includes an engagement material.

4. The compact motorized dolly of claim 1 wherein the device mount is a planar mount mounted above the wheel assembly and the elongated casing such that a device mounted to the planar mount moves with the compact motorized dolly when the drive motor is activated.

5. The compact motorized dolly of claim 1 further comprising an elongated dolly track comprising:
a first end and a second end of the elongated dolly track;
engagement rails extending upward from each of two opposing sides of the elongated dolly track between the first end and the second end; and
wherein the first circular wheel and the set of wheels include engagement grooves along their exterior circumference such that, when the compact motorized dolly is placed on the elongated dolly track, the engagement grooves of each of the first circular wheel and the set of wheels fit over one of the engagement rails.

6. The compact motorized dolly of claim 1 further including a panoramic base comprising:
a base;
a bearing above and in contact with the base; and
a bracket, above and in contact with the bearing, through which a proximal end of the elongated casing may pass thereby leaving the first circular wheel able to move freely in a circle around the base, wherein the device mount affixed to the bracket.

7. The compact motorized dolly of claim 1 further comprising a magnetic sensor, within the elongated casing and under the control of electronic circuitry such that proximity of the magnetic sensor to a magnet causes the electronic circuitry to instruct the drive motor to operate for a predetermined period of time.

8. The compact motorized dolly of claim 7 further comprising a magnetic sensor, within the elongated casing and under the control of electronic circuitry such that proximity of the magnetic sensor to a magnet causes the electronic circuitry to instruct the drive motor to operate for a predetermined period of time.

9. The compact motorized dolly of claim 1 wherein the elongated casing is comprised of a material that does not interfere with magnetic fields.

10. The compact motorized dolly of claim 1 wherein the device is a motion picture camera.

11. The compact motorized dolly of claim 1 wherein the device is a three-dimensional capture device for creating three-dimensional models from physical objects or locations.

12. A compact motorized dolly comprising:
an elongated casing defining a longitudinal axis and incorporating a power source and a drive motor, the elongated casing having a proximal end and a distal end spaced apart along the axis;
a single circular drive wheel rotatably affixed to the distal end of the elongated casing and coupled to the at least one drive motor such that actuation of the drive motor causes the drive wheel to turn about the axis;
a device mount secured to the compact motorized dolly such that a device mounted to the device mount moves along with the compact motorized dolly when the drive motor is activated;
an electronic controller circuitry for controlling the operation of the power source and the at least one drive motor;
a single button; and
wherein the electronic controller circuitry operates in response to depression of the single button such that different numbers of depressions within a predetermined time-period causes the electronic controller to enter different operational modes for driving the drive motor.

13. The compact motorized dolly of claim 12 wherein the electronic controller circuitry is in wireless communication with a computing device to thereby select one or more of the different operational modes for driving the drive motor.

14. The compact motorized dolly of claim 13 wherein the bracket further includes a clamp which may be clamped down upon the proximal end of the elongated casing.

15. The compact motorized dolly of claim 13 wherein the device mount is a planar mount affixed to a top of the bracket, over the elongated casing such that a device mounted to the planar mount turns in a circle with the bracket when the drive motor is activated.

* * * * *